March 26, 1957  DE WITT D. EATON ET AL  2,786,306
SHEET MATERIAL FOR PLANT CULTURE
Filed March 19, 1954
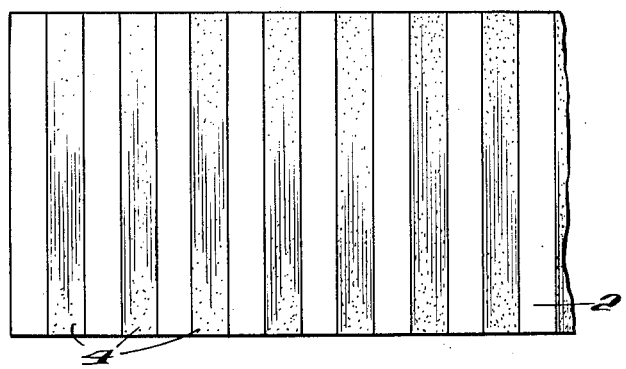
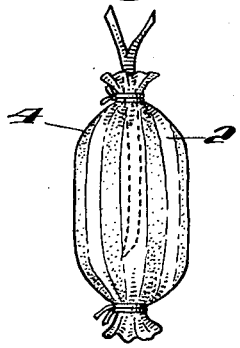
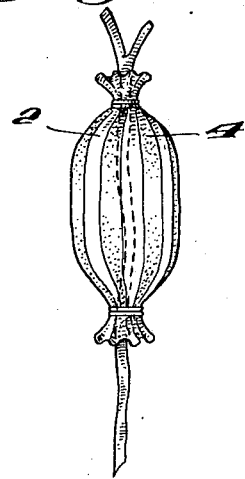
INVENTORS
DeWITT D. EATON,
GUY S. PASCHAL,
BY
ATTORNEYS

2,786,306

SHEET MATERIAL FOR PLANT CULTURE

De Witt D. Eaton and Guy Sherman Paschal, Sarasota, Fla.

Application March 19, 1954, Serial No. 417,284

2 Claims. (Cl. 47—37)

The present invention relates to a new and improved material for use in plant culture and more particularly for promoting growth and the production and prolification of roots of plants, plant cuttings, or other plant stock employed in the vegetative propagation of plants, as well as to a novel method of propagating plants with the aid of such material.

The novel material of the present invention is especially suitable for two of the methods now in general use for the vegetative propagation of plants. The first of these generally involves taking a cutting from the parent plant stock, associating such cutting with a moist rooting medium in which root growth is to be promoted and in some instances plant growth is initiated and after sufficient root growth is established the cutting may be planted in the usual way. The second method of vegetative propagation of plants for which the material of the present invention is particularly adopted is the so-called "air-layering" method in which branches or limbs of plants to be propagated are not completely separated from the parent stock, while rooting is induced. In this method a limb or branch of a living plant is mutilated, for example, by notching or girdling a limb of a branch of a living plant and then surrounding the mutilated portion with a moist rooting medium until roots have formed after which the rooted branch is cut off and planted.

Which of the procedures described is followed depends largely upon the particular circumstances involved. Usually nurseries prefer the former in which cuttings are taken, whereas the air layering method has been found particularly effective in propagating plants in groves or plantations such as orange groves and rubber plantations. It is understood of course, that plants may respond better to one or the other of the methods depending upon the variety of plant involved as well as the type of stock, for example, hard wood or soft wood, to be propagated.

The vegetative propagation of plants as is well known is fraught with difficulties, particularly in the case of plants in which the induction of root growth is difficult and/or requires a long time. The percentage of "takes" in many instances is low, even in commercial establishments where the propagation is carried out by professionals. Furthermore, the maintenance of the rooting medium in proper condition for inducing root growth is not only difficult in many instances, but also time consuming.

A method of propagation of plants by air layering has been developed in recent years which has provided a number of improvements over older methods. This method which is described in Grove Patent No. 2,572,473 involves the use of a plastic gas pervious but water impervious film as a cover over the moist rooting material employed to surround the mutilated area of the branch to be propagated. While such process rendered it less difficult to maintain the necessary moisture content in the rooting material and also to a certain extent improved the number of "takes" obtained, it still left much room for improvement.

It is an object of the invention to provide an improved material and method for the vegetative propagation of plants which will not only materially shorten the time required therefor, but which will also increase the proportion of "takes."

The novel material according to the invention which is employed to surround the rooting medium used essentially comprises a gas pervious but substantially water impervious sheet or film of plastic material such as, for example, has been described in Grove Patent No. 2,572,473, at least one surface of which also carries a continuous or a discontinuous coating containing a root growth promoting substance preferably in combination with other materials such as plant nutrients which are released to the moist rooting medium in contact therewith during the root propagating period. Preferably the nature of the coating is such that it is also gas pervious and that at least a substantial portion thereof can be rubbed off when moistened with water.

Many types of plastic sheets or films are suitable for the base of the novel material according to the invention, as examples, the semi-transparent polyethylene, rubber hydrochloride and vinyl base sheets or films have been found suitable. As examples, the film marketed by the Goodyear Tire and Rubber Company as "250 gauge P9 Vitafilm," which is a rubber hydrochloride base film and the film sold under the name "vinyl film" by the Goodrich Company have been found suitable for the purposes of the invention.

Tests have shown, for example, that the water transmission rate, carbon dioxide transmission rate, and oxygen transmission rate of The Goodrich Company's "vinyl film," above referred to, are as follows:

Water vapor—1.32 gms./100 sq. in./24 hours at 88° F. and 50% relative humidity.

$CO_2$—115,000 cc./100 sq. in./100 hours at 77° F. and 1 atmosphere partial pressure differential.

$O_2$—62,300 cc./100 sq. in./100 hours at 77° F. and 1 atmosphere partial pressure differential.

The coating which is provided on the plastic film or sheet according to the invention essentially contains a root growth promoting hormone and is of such nature that upon moistening and rubbing against a plant part upon which root growth is to be promoted a quantity of such hormone sufficient to promote root growth will be transferred to such plant part. Preferably such coating also contains a dye or pigment which will also rub off together with the hormone upon such plant part so that the transfer of the hormone to the plant part is apparent to the naked eye and which will assist the plant propagator in gauging the amount of hormone directly applied to the plant part. Furthermore, the dye or pigment incorporated in the coating preferably is of a color such as will absorb radiated heat, for example, green, red or blue, as it was found that the heat absorbed thereby materially assists in promoting rooting or root growth when the coated material is employed according to the invention in the vegetative propagation of plants. The dye and hormone containing coating is advantageously applied in a discontinuous pattern so that, for example, only about ⅓ to ⅔ of the film base is covered thereby. Such discontinuous pattern can, for example, be in the form of spaced stripes, circles, squares or any other configuration which repeatedly leaves coating free areas upon the film base. This manner of application of the coating not only has the advantage that coating free semi-transparent areas remain through which progress of the root growth can be observed, but also in that it permits a proper balance between the light and heat absorbed by the coating and that transmitted directly to the rooting medium through the semi-transparent uncoated areas. It has been found that the presence of the heat absorbing dye in the coating, according to the invention, not only effects an increase in the temperature of the rooting medium, but also as such coating itself tends to heat up the additional localized heat tends to draw the roots as they grow toward the coating where they can absorb the root growth promoting hormone, as well as any other materials incorporated in such coating. As the pigment or dye employed in the coating gradually tends to come off when such coating is in contact with the moisture rooting medium, the coating will become lighter in color as the rooting proceeds. While this has a tendency to lower the temperature of the rooting medium, it has been found that as rooting proceeds lower temperatures are required. The dyes or pigments employed, of course, should have no deleterious effect upon plants and plant growth. Suitable dyes and pigments are, for example, the following: Victoria green; Brilliant green; Malachite green; Cochineal Cadimum red; Prussian blue, and "acid green concentrated," a dye sold by Ciba Company Incorporated of the formula

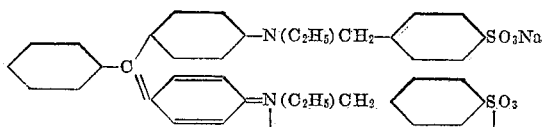

It has been also found advantageous to incorporate other materials such as, plant nutrients, vitamins, insecticides, fungicides, antibiotics and the like in addition to the hormone and dye in the coating applied to the plastic film.

The following are examples of formulations which have been found satisfactory for the coatings according to the invention.

*Example 1*

Nutrients:    Grams
  Triple superphosphate _____ 80
  Urea _____ 10
  Potassium nitrate _____ 10
  Trace elements, such as soluble salts of copper, manganese, cobalt, iron, zinc _____ 2
Hormone:
  Indole butyric acid _____ 40
Vitamins:
  Thiamine hydrochloride _____ 2
  Pyridoxin _____ 0.1
Insecticide:
  Dichlorodiphenyl trichloroethane _____ 4
Antibiotic:
  Aureomycin _____ 1
Fungicides:
  Calcium propionate _____ 7
  Green dye _____ 40

*Example 2*

Nutrients:    Grams
  Potassium phosphate _____ 40
  Calcium acid phosphate _____ 10
  Sodium nitrate _____ 10
  Trace elements _____ 1
Hormone:
  Indole acetic acid _____ 30
Insecticide:
  Benzene hexachloride _____ 5
Antibiotic:
  Streptomycin _____ 1
Fungicides:
  Zinc caprylate _____ 5
  Red dye _____ 30

*Example 3*

Nutrients:    Grams
  Triple superphosphate _____ 60
  Ammonium phosphate _____ 10
  Potassium nitrate _____ 20
Hormone:
  Naphthalene acetic acid _____ 30
Fungicide:
  Malachite green _____ 30

Such formulations can be applied as coatings to the film base in producing the improved material according to the invention by preparing such formulations from very finely pulverized individual formulation with twenty gallons of an organic solvent such as acetone, methyl, ethyl, ketone or ether to produce a mixture in which some of the ingredients are dissolved and the others are suspended. This mixture is then employed with suitable agitation to maintain a uniform suspension of the non-dissolved ingredients and is applied to the film by any suitable means, for example, by a printing press. A further formulation which has been found exceptionally satisfactory for application to the film with the aid of a printing press is as follows:

| | |
|---|---|
| Mono-potassium phosphate _____ 12 gm. | in 10 oz. of water. |
| Triple superphosphate _____ 36 gm. | |
| Potassium nitrate _____ 12 gm. | |
| 2 capsules trace minerals. | |
| Thiamin hydrochloride _____ 0.6 gm. | |
| Pyridoxin hydrochloride _____ 2.40 gm. | |
| Nicotine sulfate _____ 0.90 gm. | in 2 quarts of acetone. |
| Methyl parahydroxy benzoate _____ 18 gm. | |
| Indole butyric acid _____ 0.8 gm. | |
| A naphthalene acetic acid _____ 4.0 gm. | |
| Acid green concentrated _____ 730 gm. | in 2 quarts of methanol. |

After evaporation of the solvent from the printed surface the formulations form a firmly adherent coating upon the film base which nevertheless can be rubbed off upon moistening with water and which will also gradually give up its ingredients to the moist rooting medium when the film is employed to cover or wrap such rooting medium with the surface bearing the coating face in. Furthermore, coatings produced as described above have been found not to retard the passage of $CO_2$ and $O_2$ and other gases involved in plant metabolism through the film base employed. Consequently, it is also within the purview of the invention to apply the coating over the entire surface of the film base although as indicated above, it is preferable when such coating contains a dye to apply such coating in a discontinuous or open design.

In use of the material according to the invention in the propagation of plants, the mutilated area of the plant stock is first rubbed with a portion of the coated side of the material so as to transfer some of the coating material carrying the root growth promoting hormone directly to the mutilated area. This preferably should be done while the mutilation is still fresh. In the event that the mutilation itself does not bear sufficient moisture to cause a sufficient quantity of the coating to be transferred thereto, it is advisable to moisten the portion of the coating with which the mutilated area is rubbed.

The mutilated area is then surrounded by a moist rooting medium such as moist soil, moist sphagnum moss, moist synthetic moss such as cellulose sponge or other rooting material, and the rooting material is then wrapped with the material according to the invention with the coated side towards the rooting material and the ends sealed or closed to prevent excessive loss or moisture. No further attention to the plant stock is required until the end of the rooting period which is easily ascertained by observing the incidence of roots through the semi-transparent plastic wrapping. After completion of the rooting period the plastic wrap is removed and the rooted plant is set out in the ground or planted in pots in the usual way.

When the plant stock is severed completely from the parent plant as in taking cuttings, several of the cuttings can be made up into one package simply by placing the rooting medium upon a long sheet of the material according to the invention with the coated side towards the rooting medium, embedding the cut or mutilated ends of the cuttings, which have been previously rubbed with the coating as described above, in such rooting medium, folding the plastic sheet over upon the rooting medium and itself. The assembly can then be rolled into a bundle and left in this condition until the end of the rooting stage. The open edges of the material are preferably sealed or closed in a manner to prevent excessive escape of moisture. Such bundles containing cuttings can be sold as such to the consumer either immediately, during any stage of the rooting period, or even after completion of the rooting period as it has been found that the rooted cuttings will flourish in such package for some time after completion of the rooting period.

Comparative tests have shown that the material according to the invention has substantial advantages over the uncoated material described in Grove's Patent No. 2,572,473, as it promotes rooting in a materially shorter period of time and provides for an increased number of takes over plant stock propagated with the aid of the uncoated material even though the mutilated areas of the plant stock to be propagated had been dusted with a root growth stimulating hormone. Thus, it is clearly apparent that the coating upon the material according to the invention produces beneficial effects during the rooting period itself probably by the gradual transfer of the ingredients thereof to the rooting medium as well as the roots forming.

It is of course understood that the formulations given by way of example for the coating can be altered to meet the particular needs and that some of the ingredients may be omitted without departure from the spirit and scope of the invention and that it is also within the purview of the invention that further nutrients, auxins and synergistic agents can be added.

While the material according to the invention has been described with particular reference to use in the vegetative propagation of plants it has also been used advantageously in other connections with the growth and preservation of plants. For example, the material in accordance with the invention has been found admirably suited for shipping and storing plants such as are usually sold by nurseries. For example, rooted perennial stock when wrapped in moist sphagnum moss and then wrapped in the material according to the invention with the coated side in will retain its vigor longer than when wrapped in other materials. Consequently, such plant stock has a materially improved "shelf-life."

The accompanying drawing will serve to illustrate a preferred form of the novel material according to the invention in which:

Fig. 1 is a plan view of a strip or sheet of such material;

Fig. 2 is a side view of such strip or sheet of such material;

Fig. 3 shows a side elevation of a plant package according to the invention adapted for rooting cuttings, and Fig. 4 shows a side elevation of an air layer embodying the novel sheet material according to the invention.

For clarity of illustration, the thickness of the plastic and coating has been somewhat exaggerated.

Referring to Figures 1 and 2 of the drawings, 2 designates a plastic sheet or film which has the properties previously described, namely, in being pervious to gases such as $CO_2$ and $O_2$ and other gases involved in plant metabolism while being substantially impervious to moisture or water.

The plastic sheet 2 is provided on one of its faces with a plurality of spaced stripes 4 of a coating composition of one of the formulations given above which have been applied, for example, by mixing such formulation with a volatile organic solvent and using the resulting mixture to print the plastic sheet 2 so that the coated material carries about 0.0016 gram of hormone per square foot.

This application is a continuation in part of our co-pending application S. N. 356,236, filed May 20, 1953, now abandoned.

We claim:

1. A material for promoting plant root growth comprising a semi-transparent self-sustaining flexible sheet of material which is pervious to gases involved in the metabolic process of plants and substantially impervious to water and a coating on one face of said sheet containing a root growth promoting hormone and a coloring material capable of absorbing radiant heat, said coating being discontinuous to provide regularly recurring coating free areas upon such sheet.

2. A material according to claim 1 in which said coating also contains a plant nutrient.

References Cited in the file of this patent

UNITED STATES PATENTS

| | | |
|---|---|---|
| 2,083,065 | Heyl | June 8, 1937 |
| 2,168,523 | Heyl | Aug. 8, 1939 |
| 2,251,263 | Avery | Aug. 5, 1941 |
| 2,341,868 | Hitchcock | Feb. 14, 1944 |
| 2,572,473 | Grove | Oct. 23, 1951 |
| 2,648,165 | Nestor | Aug. 11, 1953 |

FOREIGN PATENTS

| | | |
|---|---|---|
| 107,935 | Australia | July 10, 1939 |
| 907,739 | France | July 16, 1945 |
| 986,750 | France | Apr. 4, 1951 |
| 250,282 | Switzerland | June 16, 1948 |

OTHER REFERENCES

The Garden, vol. 88, pages 535–536 (August 2, 1924), article "Botanical Wizardry."

Modern Packaging, vol. 17, No. 2, pages 103–107 (October 1943), article "Pliofilm . . ."

Washington (D. C. Sunday Star, June 25, 1950, page B–6, article "Farm and Garden. New Air-Layering . . ." by Youngman.